United States Patent Office 2,877,245
Patented Mar. 10, 1959

2,877,245

PROCESS OF PREPARING β,β,β-TRIS(HYDROXY-METHYL) METHYL AMIDES

Vincent Lamberti, Hackensack, N. J., assignor to Lever Brothers Company, New York, N. Y., a corporation of Maine No Drawing. Application November 17, 1955
Serial No. 547,542

5 Claims. (Cl. 260—404)

This invention relates to a process for the preparation of β,β,β-tris(hydroxymethyl) methyl amides from 4,4-bis(hydroxymethyl)-2-substituted oxazolines.

Pierce and Lunsford, J. Am. Chem. Soc., 73, 2596-98 (1951) describe the preparation of monoacyl derivatives of tris(hydroxymethyl) amino methane by the hydrolysis of 4,4-bis(hydroxymethyl)-2-substituted oxazolines using alcoholic hydrogen chloride. Concentrated hydrochloric acid is added to an absolute ethyl alcohol solution of the oxazoline, and the solution is allowed to stand for one-half hour, with heating if desired. Addition of dry ether causes precipitation of the crystalline ester hydrochloride in some cases. In other cases the solution is heated and then evaporated to low volume under vacuum. The residue then is taken up in hot butanol from which a crystalline product precipitates upon cooling. This treatment results in the cleavage of the oxazoline ring and the formation of 2-amino-3-hydroxy-2-hydroxymethyl propyl ester hydrochlorides, the acyl group having migrated back to the oxygen atom.

The hydrochloride then is converted to the N(2-hydroxy 1,1-bis(hydroxymethyl) ethyl) amide on making the aqueous solution basic. The crystalline product must be dissolved in a basic solution to convert it from the hydrochloride to the free amide, which precipitates from the aqueous alkaline solution and then is recrystallized from butanol.

The hydrolysis of the oxazoline in alcoholic hydrogen chloride is not practical to carry out on a large scale. In accordance with the instant invention, it has been discovered that the amide is obtainable directly from the oxazoline by hydrolysis in boiling water. This procedure avoids the formation of the intermediate 2-amino-3-hydroxy-2-hydroxymethyl propyl ester hydrochloride, and the accompanying conversion of this to the amide by treating with aqueous alkali. The aqueous hydrolysis of the invention is readily carried out, inasmuch as the reaction temperature is easily controlled and neither the temperature nor the amounts of water in proportion to the oxazoline are critical.

The process of the invention is applicable to any oxazolines having a long chain aliphatic radical attached to the 2-carbon atom. These oxazolines can be defined by the following general formula:

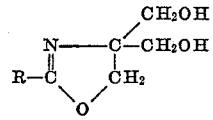

where R is an aliphatic radical, which may be either saturated or unsaturated and straight or branched chain, having from about nine to about seventeen carbon atoms. For example, R can be undecyl, nonyl, tridecyl, pentadecyl, heptadecyl, and heptadecenyl and the mixtures of fatty alkyl and alkenyl radicals derived from naturally-occuring fats and oils, such as coconut oil and palm oil.

Oxazolines having short chain, i. e., eight carbon and smaller, aliphatic radicals at the 2-position are considerably more resistant to hydrolysis, and require the stringent conditions described in the Pierce and Lunsford article.

The reaction of the invention can be represented by the following scheme:

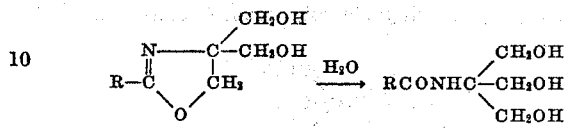

The oxazoline is only sparsely soluble even in boiling water. As the reaction proceeds, it gradually becomes dispersed, and finally completely dissolves. The hydrolysis thus is complete when the oxazoline has disappeared. A substantially quantitative yield is obtainable.

The hydrolysis will proceed at temperatures of from 100° C. to as low as about 85° C. although somewhat more slowly. There is no critical upper reaction temperature limit, but as a practical matter it would of course be held to the boiling point of water at atmospheric pressure. Usually, it will be found most convenient to carry out the reaction under reflux.

The procedure of the invention is illustrated by the following:

Example

The 4,4-bis(hydroxymethyl)-2-undecyl oxazoline (10 grams) was refluxed with 200 ml. of water for three hours. Initially the oxazoline was insoluble in the solution, but at the end of the reaction all of it had been solubilized. The N-tris(methylol) methyl lauramide was isolated from the reaction mixture by extraction with hot chloroform. On cooling, the amide crystallized (yield, 7.1 g.; more can be obtained by additional extraction). It was purified by recrystallization from fresh chloroform (light plates, M. P. 115.2–115.7° C.). Analysis for percent nitrogen: found, 4.48%, theoretical for $C_{16}H_{33}O_4N$, 4.62%.

| | Melting Point °C. |
|---|---|
| $C_{11}H_{23}CONH-\underset{\underset{CH_2OH}{\mid}}{\overset{\overset{CH_2OH}{\mid}}{C}}-CH_2OH$ | 115.2–115.7 |

By this procedure, each of the following N-tris(methylol) methyl alkyl amides also were prepared:

| | Melting Point °C. |
|---|---|
| $C_{12}H_{27}CONH-\underset{\underset{CH_2OH}{\mid}}{\overset{\overset{CH_2OH}{\mid}}{C}}-CH_2OH$ | 112.0–115.4 |
| $C_9H_{19}CONH-\underset{\underset{CH_2OH}{\mid}}{\overset{\overset{CH_2OH}{\mid}}{C}}H_2OH$ | 111.4–112.0 |
| $C_{15}H_{31}CONH-\underset{\underset{CH_2OH}{\mid}}{\overset{\overset{CH_2OH}{\mid}}{C}}-CH_2OH$ | 123.0–115.5 |

I claim:
1. A process for the preparation of N-tris(methylol) methyl amides from the corresponding oxazolines which comprises subjecting an oxazoline having the formula

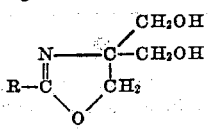

where R is an aliphatic radical having from about nine to about seventeen carbon atoms to the hydrolyzing action of water at a temperature within the range from about 85° C. to the boiling point of water until the corresponding N-tris(methylol) methyl amide of the formula

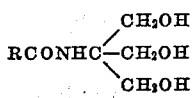

is obtained.

2. A process in accordance with claim 1 in which the oxazoline is 4,4-bis(hydroxymethyl)-2-undecyl oxazoline.

3. A process in accordance with claim 1 in which the oxazoline is 4,4-bis(hydroxymethyl)-2-pentadecyl oxazoline.

4. A process in accordance with claim 1 in which the oxazoline is 4,4-bis(hydroxymethyl)-2-tridecyl oxazoline.

5. A process in accordance with claim 1 in which the water is refluxed.

References Cited in the file of this patent

UNITED STATES PATENTS

| | | |
|---|---|---|
| 2,513,346 | Moersch et al. | July 4, 1950 |
| 2,564,423 | Barnum | Aug. 14, 1951 |
| 2,692,897 | Moersch | Oct. 26, 1954 |

OTHER REFERENCES

Whitmore: Organic Chemistry, 1937, page 896.

UNITED STATES PATENT OFFICE
CERTIFICATE OF CORRECTION

Patent No. 2,877,245                      March 10, 1959

Vincent Lamberti

It is hereby certified that error appears in the printed specification of the above numbered patent requiring correction and that the said Letters Patent should read as corrected below.

Column 2, line 62, in the table, first column, middle line of second formula, for "$C_9H_{19}CONH-CH_2OH$" read -- $C_9H_{19}CONH-C-CH_2OH$ --; line 65, same table, last column, for "123.0-115.5" read -- 113.0-115.5 --.

Signed and sealed this 23rd day of June 1959.

(SEAL)
Attest:

KARL H. AXLINE
Attesting Officer

ROBERT C. WATSON
Commissioner of Patents